L. R. SMITH.
HEAT STORING ATTACHMENT FOR STOVES.
APPLICATION FILED JAN. 9, 1908.
944,515.
Patented Dec. 28, 1909.
2 SHEETS—SHEET 1.
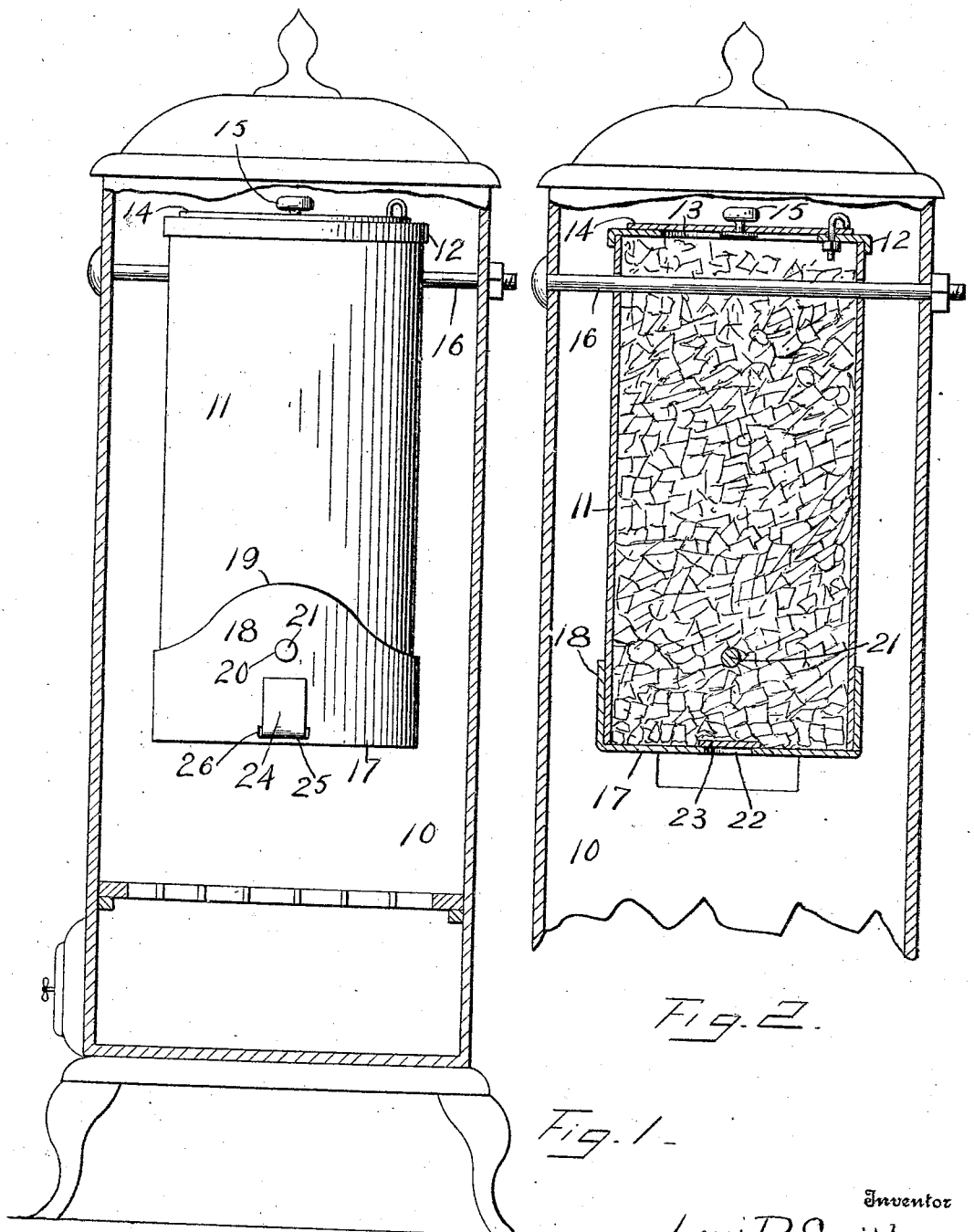
Fig. 1.
Fig. 2.
Witnesses
J. C. Simpson.
L. G. Smith.
Inventor
Levi R. Smith.
Attorneys

L. R. SMITH.
HEAT STORING ATTACHMENT FOR STOVES.
APPLICATION FILED JAN. 9, 1908.

944,515.

Patented Dec. 28, 1909.
2 SHEETS—SHEET 2.

Witnesses
J. C. Simpson
F. G. Smith

Inventor
Levi R. Smith.

By Chandler & Chandler

Attorneys

UNITED STATES PATENT OFFICE.

LEVI R. SMITH, OF LATHAM, KANSAS.

HEAT-STORING ATTACHMENT FOR STOVES.

944,515.　　　　　Specification of Letters Patent.　　Patented Dec. 28, 1909.

Application filed January 9, 1908.　Serial No. 409,976.

*To all whom it may concern:*

Be it known that I, LEVI R. SMITH, a citizen of the United States, residing at Latham, in the county of Butler, State of Kansas, have invented certain new and useful Improvements in Heat-Storing Attachments for Stoves; and I do hereby declare the following to be a full, clear, and exact description of the invention, such as will enable others skilled in the art to which it appertains to make and use the same.

This invention relates to heat storing attachments designed for use in connection with coal, gas, wood, oil, and other stoves and has for its object to enhance the heating capacity of the stove to which it is applied and reduce the amount of fuel consumed.

It is evident and a well-known fact that a given number of cubic feet of gravel, sand, and the like when heated to a high degree, will retain heat much longer than an equal number of cubic feet of air. In carrying out my invention I embody this principle in a container which is suspended within an ordinary heating stove above the grate or jets thereof and which is filled with gravel, sand, slate, or in fact any material capable of storing and retaining heat for a considerable length of time.

Figure 3:
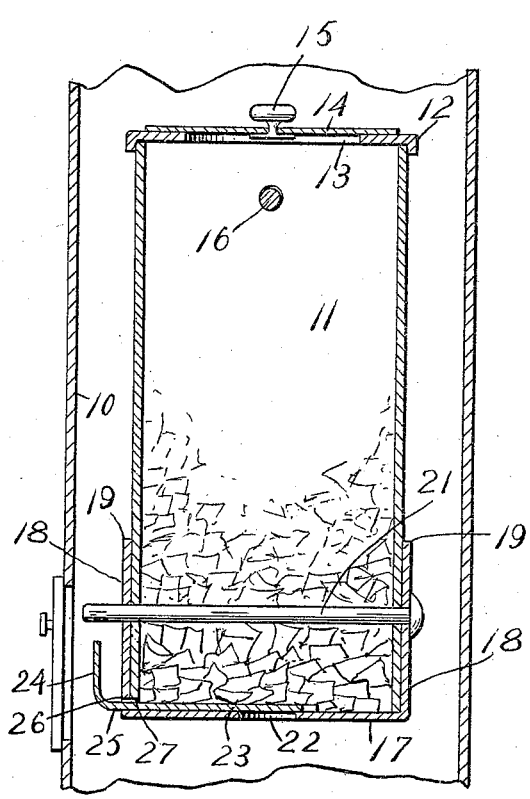
Figure 4:
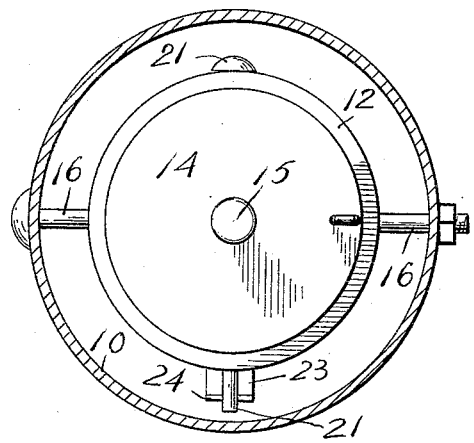
Figure 5:
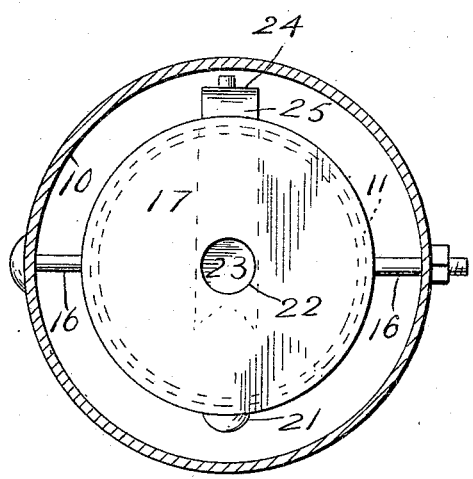

In the accompanying drawings, Figure 1 is a vertical sectional view through the body of a common form of heating stove showing my appliance suspended therewithin, the device being shown in elevation, Fig. 2 is a similar view but showing the device also in section, Fig. 3 is a view similar to Fig. 2 but taken in a plane at right angles with respect thereto, Fig. 4 is a top plan view of the device, the stove body being shown in horizontal section, and, Fig. 5 is a bottom plan view of the device showing the slide in the bottom thereof in dotted lines.

In the drawings there is shown a stove body or drum 10 which while it is here shown as being integral in form, may be of any ordinary shape and size.

The device embodied in my invention is in the form of a cylinder 11 provided with a top 12 having a filling opening 13 formed therein and having swiveled to it a cover 14 which may be moved into position to close the said opening 13 by grasping a handle 15 thereon. The said cylinder is suspended within the stove body by means of a bolt rod 16 which is passed transversely through the body adjacent the upper end thereof and also transversely through the upper portion of the cylinder.

The cylinder is provided with a removable bottom which comprises a bottom plate 17 which is circular in form, and a vertical wall or flange 18 which projects upwardly from the periphery of the bottom plate and which is increased in height as at 19 at diametrically opposite points and formed through its portions 19 with openings 20 for the passage of a removable bolt rod 21 this bottom being fitted upon the lower ends of the cylinder and the bolt rod being passed also through the cylinder adjacent the lower end thereof, the bottom being in this manner connected with the cylinder. The bottom plate 17 of the bottom is formed with an opening 22 which is centrally located and which may be closed by means of a cut-off plate 23 which is slidable upon the inner face of the said bottom plate and may be moved by grasping the handle end 24 of a shank 25 which is formed integral therewith and which projects or works through a slot 26 formed in one side of the flange of the bottom, the lower edge of the cylinder being notched as at 27 at a corresponding point to permit of reciprocation of the shank for the purpose of closing or exposing the opening in the said bottom plate 17.

Prior to or subsequent to the mounting of the device within the body of the stove, the cylinder is filled, through the filling opening 13 in its top, with gravel, sand, slate, or any other material having the property of storing and retaining heat. As shown in the drawings, the device, when properly mounted within the stove, is spaced from the wall of the body thereof at all points and is so located that its bottom or lower end is located but a short distance above the grate or jets of the stove. It will be understood from the above that the hot air currents are first directed against the bottom of the device and thence ascend in the interspace between the wall of the cylinder and the wall of the body of the drum thereby thoroughly heating the sides of the said drum. It will be observed that when the storage of heat in the drum is desired to be quickly obtained the damper 23 is moved to open the opening 22 and the cover 14 is moved to leave the opening 13 uncovered. The flame from the grate will then pass directly up and a considerable portion will enter the opening 22 and pass up into the heat retaining material in the drum, the openings 22 and 13 providing a draft. By this arrangement, the heated currents of air and combustible products of combustion are retarded in their passage from the stove and consequently not only will fuel be saved, but more heat units will be retained in the stove. It will further be understood that after the cylinder or rather its contents have been thoroughly heated, the heat will be retained therein and even should the fire go out, a considerable amount of heat will be gradually given off by the device especially in view of the fact that it is surrounded on all sides by a hot air jacket. When the fire is out, the damper of the smoke flue will be closed to prevent the heat stored up in the cylinder from passing up said flue.

In connection with my invention it will be further understood that the cylinder or rather the entire device is suspended within the stove body for oscillatory movement and that when it is desired to clean the stove or in other words to remove the fuel from the grate thereof, it is only necessary to swing the device or rather its lower end away from that side of the wall of the said body of the stove to which the fuel doors are hinged.

What is claimed, is:—

1. The combination with a stove provided with a combustion chamber; of a container for heat retaining material held in said combustion chamber, said container being provided with an opening arranged for direct access of flame from said combustion chamber into the container, and a closure for said opening.

2. The combination with a stove provided with a combustion chamber; of a container for heat retaining material held in said combustion chamber, said container being provided with an opening arranged for direct access of flame from said combustion chamber into the container, said container being further provided with a second opening arranged to permit a draft through the container to draw the flame from the combustion chamber therethrough.

3. The combination with a stove provided with a combustion chamber; of a container for heat retaining material held in said combustion chamber, said container being provided with an opening arranged for direct access of flame from said combustion chamber into the container, said container being further provided with a second opening arranged to permit a draft through the container to draw the flame from the combustion chamber therethrough, and closures for the openings in the container to retain the heat in said container.

In testimony whereof, I affix my signature, in presence of two witnesses.

LEVI R. SMITH.

Witnesses:
C. C. CRAFT,
ALICE L. MITCHELL.